US006541881B1

(12) United States Patent
Turner

(10) Patent No.: US 6,541,881 B1
(45) Date of Patent: Apr. 1, 2003

(54) INTEGRAL THROTTLE BODY AND TORQUE MOTOR

(75) Inventor: David Turner, Bloomfield Hills, MI (US)

(73) Assignee: Eaton Corporation, Cleveland, OH (US)

( * ) Notice: Subject to any disclaimer, the term of this patent is extended or adjusted under 35 U.S.C. 154(b) by 41 days.

(21) Appl. No.: 09/251,602

(22) Filed: Feb. 17, 1999

(51) Int. Cl.[7] .......................... H02K 35/00; H02K 5/00; F16K 31/02

(52) U.S. Cl. ....................... 310/36; 310/89; 251/129.11

(58) Field of Search ............................. 310/98, 36, 38, 310/39, 89, 88, 156, 268; 251/129.11, 129.01, 65, 129.16, 71; 123/337; 174/50

(56) References Cited

U.S. PATENT DOCUMENTS

| | | | | | |
|---|---|---|---|---|---|
| 2,107,481 | A | * | 2/1938 | Johnson | 103/102 |
| 2,465,042 | A | * | 3/1949 | Schlenker et al. | 172/36 |
| 2,642,077 | A | * | 6/1953 | Waterman | 137/117 |
| 2,774,251 | A | * | 12/1956 | Price | 74/365 |
| 4,409,940 | A | * | 10/1983 | Gaus | 123/361 |
| 4,504,770 | A | | 3/1985 | Burkel et al. | 318/560 |
| 4,546,338 | A | * | 10/1985 | Idogaki et al. | 335/229 |
| 4,601,271 | A | * | 7/1986 | Ejiri et al. | 123/361 |
| 4,650,156 | A | * | 3/1987 | Kawahira | 251/129.11 |
| 4,651,041 | A | * | 3/1987 | Shiraki et al. | 310/180 |
| 4,698,535 | A | | 10/1987 | Shiraki et al. | 310/156 |
| 4,947,893 | A | * | 8/1990 | Miller et al. | 137/625.65 |
| 4,996,457 | A | * | 2/1991 | Hawsey et al. | 310/268 |
| 5,087,847 | A | * | 2/1992 | Giesbert et al. | 310/90 |
| 5,777,412 | A | * | 7/1998 | Yamamoto | 310/83 |
| 5,823,165 | A | * | 10/1998 | Sato et al. | 123/339 |
| 5,870,010 | A | | 2/1999 | Ackerman | 335/229 |

FOREIGN PATENT DOCUMENTS

| | | |
|---|---|---|
| DE | 44 45 100 A1 | 6/1996 |
| DE | 295 20 076 U1 | 4/1997 |
| EP | 0 175 903 | 4/1986 |
| EP | 0 592 083 A1 | 4/1994 |
| EP | 0 829 129 | 3/1998 |

* cited by examiner

*Primary Examiner*—Dang Dinh Le
(74) *Attorney, Agent, or Firm*—Roger A. Johnston

(57) ABSTRACT

A throttle valve assembly having a direct current torque motor assembled and calibrated as a subassembly or unit and installed on the throttle body and the throttle plate subsequently installed. The rotor is a disc defining magnetic poles and an axial air gap with the stators which are assembled in a cup-shaped housing. The housing and stators are assembled over the rotor shaft and rotor and attached to a cover plate to form a motor subassembly. The shaft of the motor subassembly is inserted in bearings in the throttle body and the subassembly secured to the throttle body by fasteners through the cover plate. The throttle plate is then installed in a slot in the motor shaft through the air passage in the throttle body.

3 Claims, 4 Drawing Sheets

INTEGRAL THROTTLE BODY AND TORQUE MOTOR

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to direct current torque motors of the type intended for forward or reverse rotation by an amount less than one complete revolution of the motor rotor. Torque motors of this type typically are employed for servo actuator devices where fractional revolution rotation of a shaft is required for performing a work function. In particular, torque motors have found application for actuating the air intake throttle valve of an internal combustion engine for vehicular applications in response to a control signal provided by an electronic controller. This is due in part to the recently imposed strict engine exhaust emission requirements for motor vehicles which have necessitated electronic control of vehicle engine operating parameters.

In such internal combustion engine throttle applications and particularly engine throttle applications for motor vehicles, it is desired to minimize the size and weight of the torque motor in as much as it must be attached to the engine throttle body structure and is therefore subjected to the elevated temperature and vibration generated by the engine. In such engine throttle applications, the torque motor must provide a substantial torque output with minimum motor coil excitation current because the motor is operating, in a typical automotive application, at relatively low voltages on the order 12–24 volts DC. It has therefore been desired to provide an electrically operated motor vehicle engine throttle actuator to provide a torque motor which produces a maximum torque with a minimum of magnetic pole structure mass in the rotor and stator for a given coil excitation current. It has also been particularly desired to provide a torque motor for vehicle engine throttle applications which is robust and accurate in rotor positioning in order to correctly position the vehicle throttle in response to an electrical throttle control signal from an on board electrical controller. Furthermore, it has been desired to provide a low voltage direct current torque motor of minimum mass and size for a vehicle throttle application which does not require magnetic flux loop or pole structure fabrication of relatively exotic or expensive materials of high magnetic permeability but is capable of being fabricated from relatively low cost iron based material.

An example of a known engine throttle torque motor arrangement is that shown and described in U.S. Pat. No. 4,698,535 issued to Shiraki, et al. which utilizes a disc like rotor with axially oppositely disposed permanent ring magnets. The aforesaid known throttle torque motor is assembled over a shaft extending from a pre-assembled throttle valve body and has the disadvantage of being complex and difficult to assemble and calibrate. Known direct current torque motors for vehicle engine throttle operation have provided the requisite torque for insuring proper throttle positioning for a given control signal, however, the known torque motor designs have proven either prohibitive in production costs for high volume mass production vehicle applications, or have been prohibitively bulky and heavy, and have required difficult and complex assembly operations to install on the vehicle engine throttle valve and calibrate when installed.

Therefore, it has long been desired to provide a direct current torque motor for servo actuator operation at relatively low voltages, particularly for vehicle engine throttle positioning which has a minimum mass, volume and maximizes the torque output therefrom for a given motor coil excitation current and which is easy to assemble, install and calibrate.

BRIEF SUMMARY OF THE INVENTION

It is an object of the present invention to provide a relatively low cost compact torque motor capable of operation at relatively low voltages and which provides maximum torque output for a fraction of a revolution of rotation of the motor shaft in forward or reverse direction and has a maximum power density with respect to the mass and volume of the motor for a given level of electrical energization. It is a further object of the present application to provide a torque motor particularly suited for use as a vehicle engine throttle actuator.

The present invention provides a torque motor having the magnetic flux loop including an axial air gap formed between stator coils and an annular rotor formed of ferrous material having permanently magnetized pole segments thereon. The magnetic components thereof, particularly the stator and rotor, are formed of low cost ferrous material such as low carbon steel with the stator disposed adjacent a disc-shaped rotor having permanent magnets disposed about the periphery and forming an axial air gap with the stator. The stator, stator coils, rotor and motor housing are preassembled over one end of the motor shaft and electrically calibrated as a unit or subassembly and then installed onto a vehicle throttle body with the shaft journalled on bearing surfaces provided therein and the throttle plate or member is subsequently assembled to the shaft. The pre-assembly of the motor to the shaft as a unit enables the motor to be electrically calibrated for rotational shaft movement prior to assembly into the vehicle throttle body thereby greatly simplifying assembly, calibration and testing and thus providing a relatively low cost torque motor for vehicle throttle applications.

DETAILED DESCRIPTION OF THE INVENTION

Figure 1:
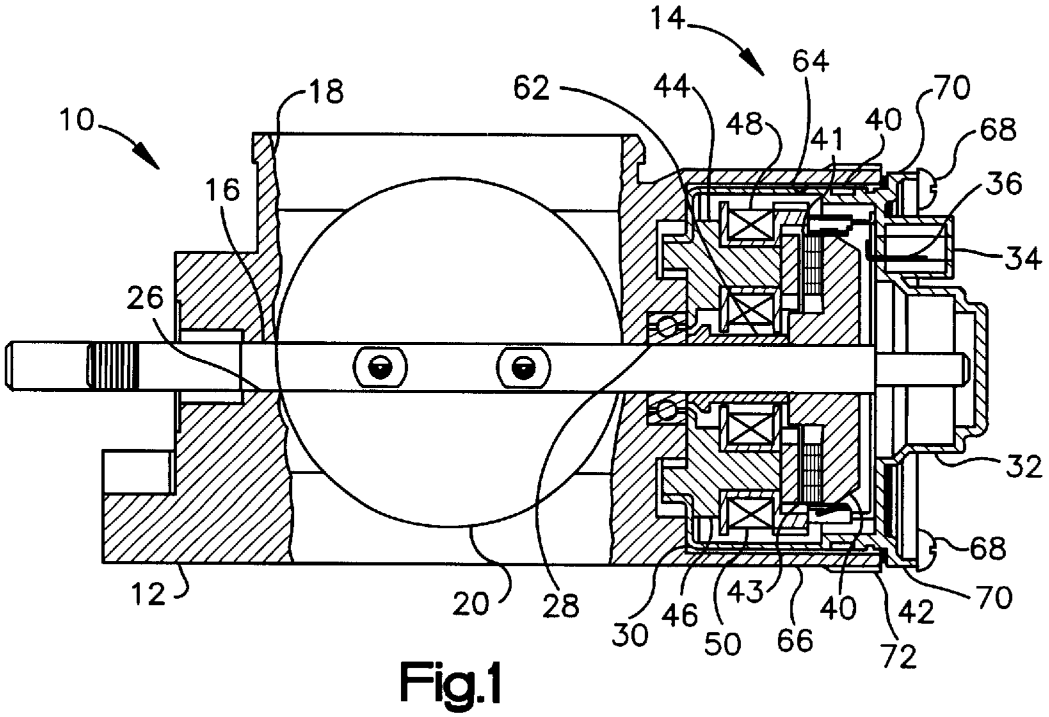
FIG. 1 is a cross-section taken through the mid-plane of a vehicle throttle valve assembly employing the torque motor of the present invention.
Figure 2:
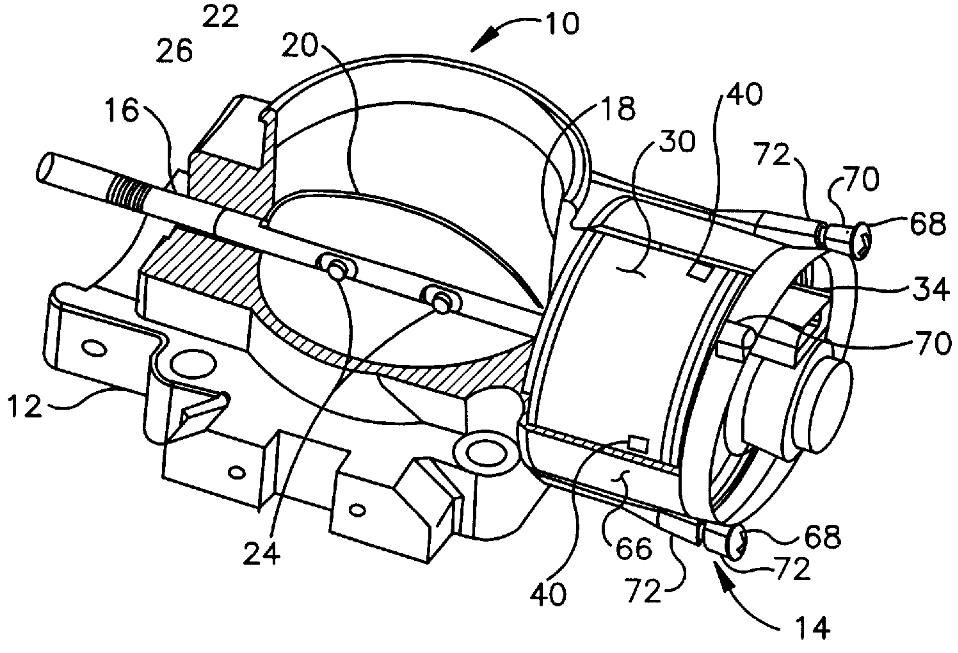
FIG. 2 is an axonometric view of the valve assembly of FIG. 1 with portions of the body broken away.
Figure 3:
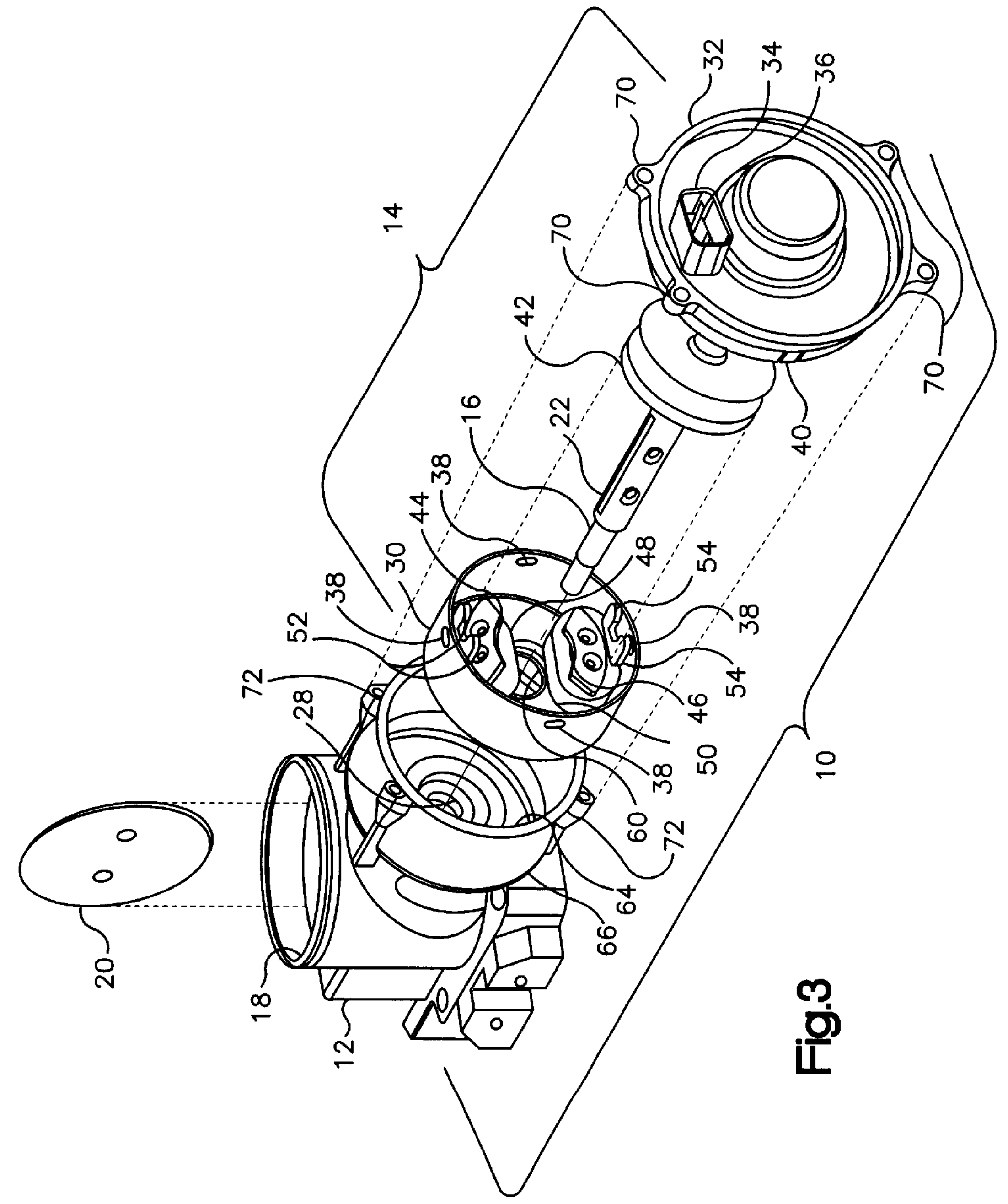
FIG. 3 is an exploded view of the throttle valve and torque motor assembly of the present invention as viewed from the motor side.

Referring to FIGS. 1 through 5, the throttle valve assembly of the present invention is indicated generally at 10 and includes a throttle body 12 having a torque motor unit or subassembly indicated generally at 14 assembled thereon with the throttle shaft 16 extending transversely through the air inlet passage 18 formed on the throttle body. The shaft has a throttle valve member or butterfly plate 20 attached thereto; as, for example, by insertion in a slot 22 formed in the shaft 16 and secured therein by preferably threaded fasteners 24. The shaft 16 is journalled on axially opposite sides of the throttle plate 20 by bearing surface means 26, 28 provided in the throttle body. In the presently preferred practice the bearing surface means 28, adjacent the motor unit 14 includes a ball race.

The motor unit or subassembly 14 includes a motor housing or shell 30 which is attached to a cover 32 which has formed, preferably integrally therewith, an electrical receptacle 34 which has electrical connector pins such as pin 36 provided therein with the housing 30 attached to the cover 32 by snap locking of slots 38 over tabs 40 disposed peripherally about the cover 32.

The shaft 16 has provided thereon in rotationally driving engagement a rotor 42 preferably formed of iron based material and which has at least two oppositely disposed magnetic poles formed thereabout. The rotor member 42 may be formed with separately magnetized pole segment members 41, 43 attached to the rotor 42 as shown in FIG. 1. In the presently preferred practice of the invention, the rotor 42 is made of iron-based material for the purposes of minimizing material costs; however, it will be understood that other materials having a high magnetic permeability and capable of being magnetized may be employed if desired.

Figure 4:
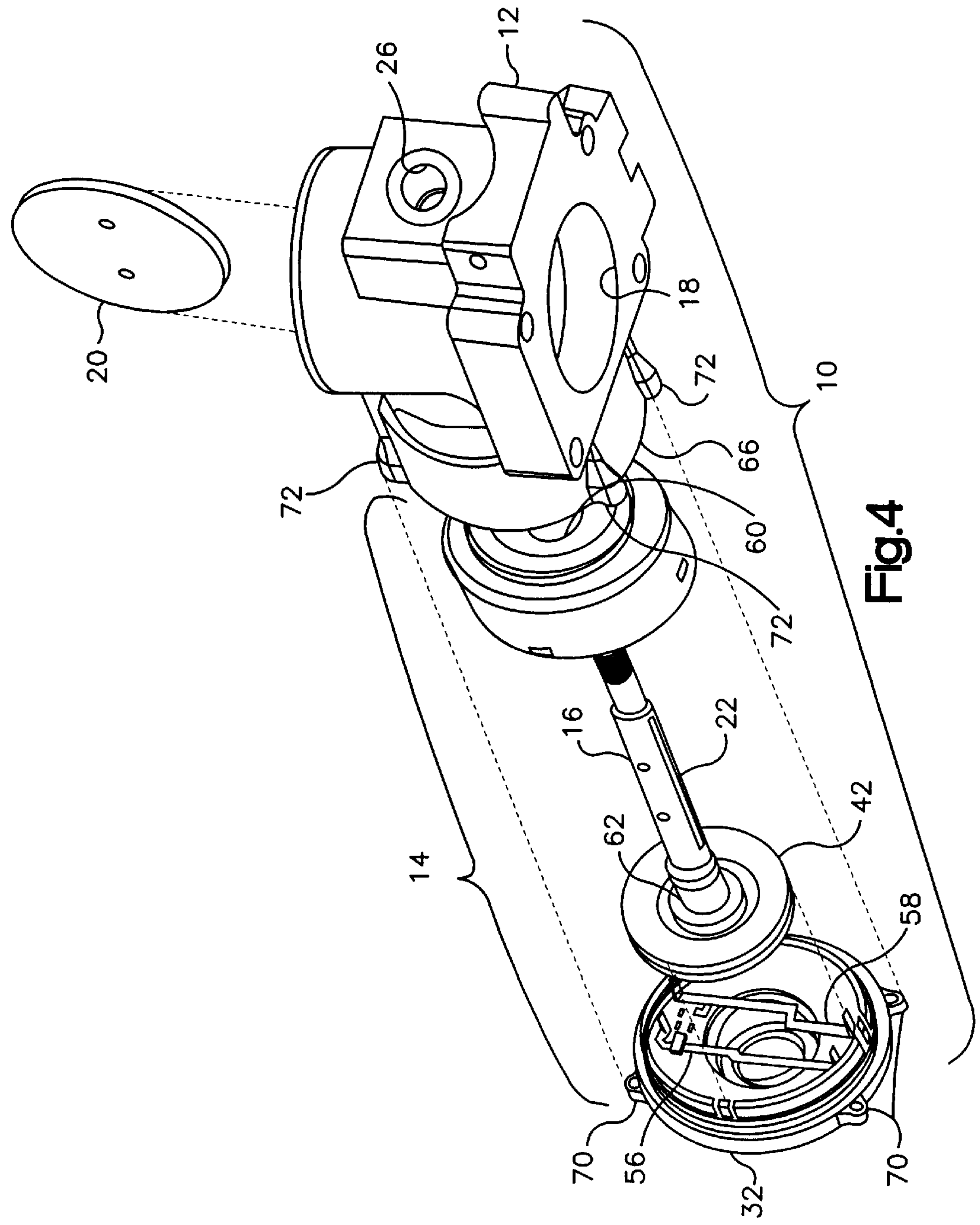
FIG. 4 is an exploded view of the present invention similar to FIG. 3 taken from the opposite side of the throttle body; and, FIG. 5 is an axonometric view of the torque motor and shaft subassembly of the present invention.
Figure 5:
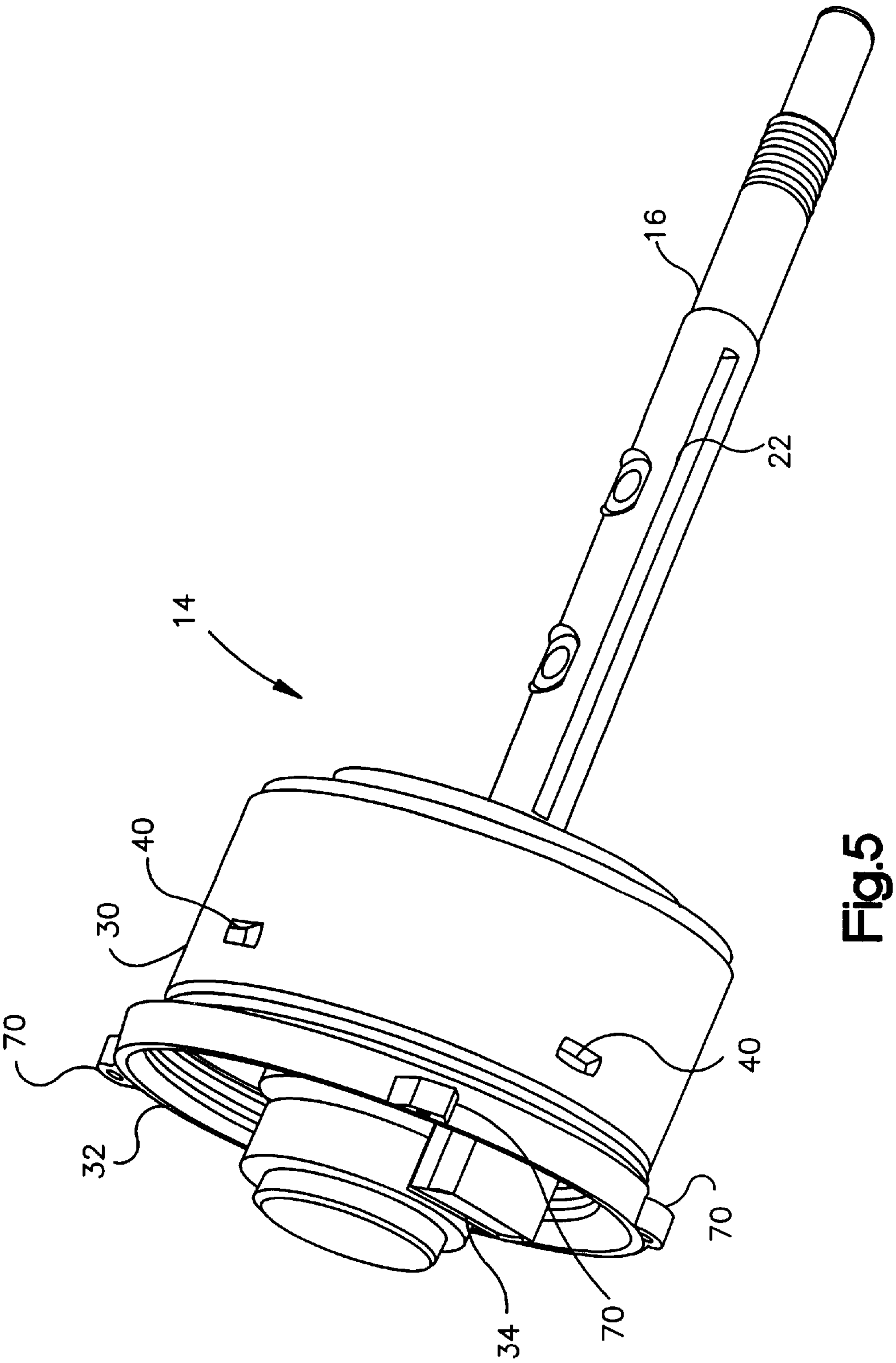

A pair of stators 44, 46 each having a generally arcuate configuration are nested inside the generally cup-shaped housing 30 and attached thereto. Each of the stators 44, 46 is formed of material having a high magnetic permeability, as for example, iron based material, and has a coil denoted respectively by reference numerals 48, 50 wound thereon. The coils each have electrical terminals provided thereon as denoted by reference numerals 52, 54 respectively. The stator members 44, 46 are secured to the housing 30 by any suitable expedient, as for example, weldment or metal deformation; and may be each formed as a two piece member as shown in cross-section in FIG. 1. It will be understood that the coil terminals 52, 54 are connected to the receptacle pins such as pin 36 by connector strips 56, 58 provided on the inside of the cover 32 as shown in FIG. 4.

At assembly, the stator members 44, 46 with coils 48, 50 respectively wound thereon are installed in the housing 30; and, the rotor 42 and shaft 16 are then disposed in the housing with the shaft 16 extending exteriorly thereof through housing aperture 60 and the housing 30 is attached to the cover 32 retaining the rotor therein. A spacer sleeve 62 is provided over shaft 16 to locate the rotor 42 axially with respect to the stators 44, 46 which spacer is shown in FIGS. 1 and 4.

The subassembly 14 of the rotor shaft housing 30 and cover 32 is then installed as a unit 14 in a bore 64 formed in boss 66 provided on the side of the throttle body 12 with shaft 16 rotatably received in journals 26, 28 in the throttle body 12. The unit 14 is then secured to the boss 66 by suitable fasteners such as screws 68 received through appropriate mounting lugs 70 provided on cover 32 and threadedly engaging correspondingly located projections 72 formed on boss 66.

The throttle plate is then inserted in slot 22 and secured by the fasteners 24. Thus, the motor unit 14 may be preassembled and pre-calibrated for mechanical rotary positioning of the shaft 16 for given electrical input signals prior to assembly of the unit 14 onto the throttle body which greatly simplifies the manufacture of the throttle valve and actuator assembly 10.

The present invention thus provides a unique, low cost and simple to assemble and calibrate torque motor for use as an engine throttle actuator and is robust and compact in size for its relatively high torque output resulting from the relatively large mass of the magnetic flux loop material. The motor unit is completed and calibrated as a unit and installed subassembly on a throttle valve body and the throttle plate installed to complete the throttle valve assembly.

Although the invention has hereinabove been described with respect to the illustrated embodiments, it will be understood that the invention is capable of modification and variation and is limited only by the following claims.

What is claimed is:

1. A motorized throttle valve assembly comprising:

(a) a throttle body defining an engine air inlet passage therethrough;

(b) shaft means extending transversely through said inlet passage and joumalled for rotational movement on said body said shaft means including driving portions thereof extending externally of said body;

(c) a valve member disposed in said inlet passage and rotationally moveable with said shaft means;

(d) a rotor including material having a relatively high magnetic permeability disposed on said shaft means in driving arrangement with said shaft means, and including a plurality of magnetized pole segments thereon;

(e) a motor housing having a stator of relatively high magnetic permeability therein, said stator having a coil of conductive material wound thereon and defining a pair of axial pole segments;

(f) a mounting member having said motor housing attached thereto retaining said rotor therein with said shaft means received through said motor housing, said rotor pole segments each defining an axial air gap with said stator pole segments;

(g) means for attaching said mounting member to said body; and, (h) connector terminal means connected to said coils and adapted for electrical connection thereto externally wherein said throttle body includes a hollow with said motor housing member received in said hollow and said mounting member serves as a closure for said hollow.

2. A motorized throttle valve assembly comprising:

(a) a throttle body defining an engine air inlet passage therethrough;

(b) shaft means extending transversely through said inlet passage and journalled for rotational movement on said body said shaft means including driving portions thereof extending externally of said body;

(c) a valve member disposed in said inlet passage and rotationally moveable with said shaft means;

(d) a rotor including material having a relatively high magnetic permeability disposed on said shaft means in driving arrangement with said shaft means, and including a plurality of magnetized pole segments thereon;

(e) a motor housing having a stator of relatively high magnetic permeability therein, said stator having a coil of conductive material wound thereon and defining a pair of axial pole segments;

(f) a mounting member having said motor housing attached thereto retaining said rotor therein with said shaft means received through said motor housing, said rotor pole segments each defining an axial air gap with said stator pole segments;

(g) means for attaching said mounting member to said body; and, (h) connector terminal means connected to said coils and adapted for electrical connection thereto externally wherein said mounting member includes electrical terminals assembled in plug-in connection with terminals on said coils.

3. A motorized throttle valve assembly comprising:

(a) a throttle body defining an engine air inlet passage therethrough;

(b) shaft means extending transversely through said inlet passage and joumalled for rotational movement on said body said shaft means including driving portions thereof extending externally of said body;

(c) a valve member disposed in said inlet passage and rotationally moveable with said shaft means;

(d) a rotor including material having a relatively high magnetic permeability disposed on said shaft means in driving arrangement with said shaft means, and including a plurality of magnetized pole segments thereon;

(e) a motor housing having a stator of relatively high magnetic permeability therein, said stator having a coil of conductive material wound thereon and defining a pair of axial pole segments;

(f) a mounting member having said motor housing attached thereto retaining said rotor therein with said shaft means received through said motor housing, said rotor pole segments each defining an axial air gap with said stator pole segments;

(g) means for attaching said mounting member to said body; and, (h) connector terminal means connected to said coils and adapted for electrical connection thereto externally wherein said motor housing has a generally cup-shaped configuration and said motor housing is snap-locked onto said mounting member.

* * * * *